Figure 1:
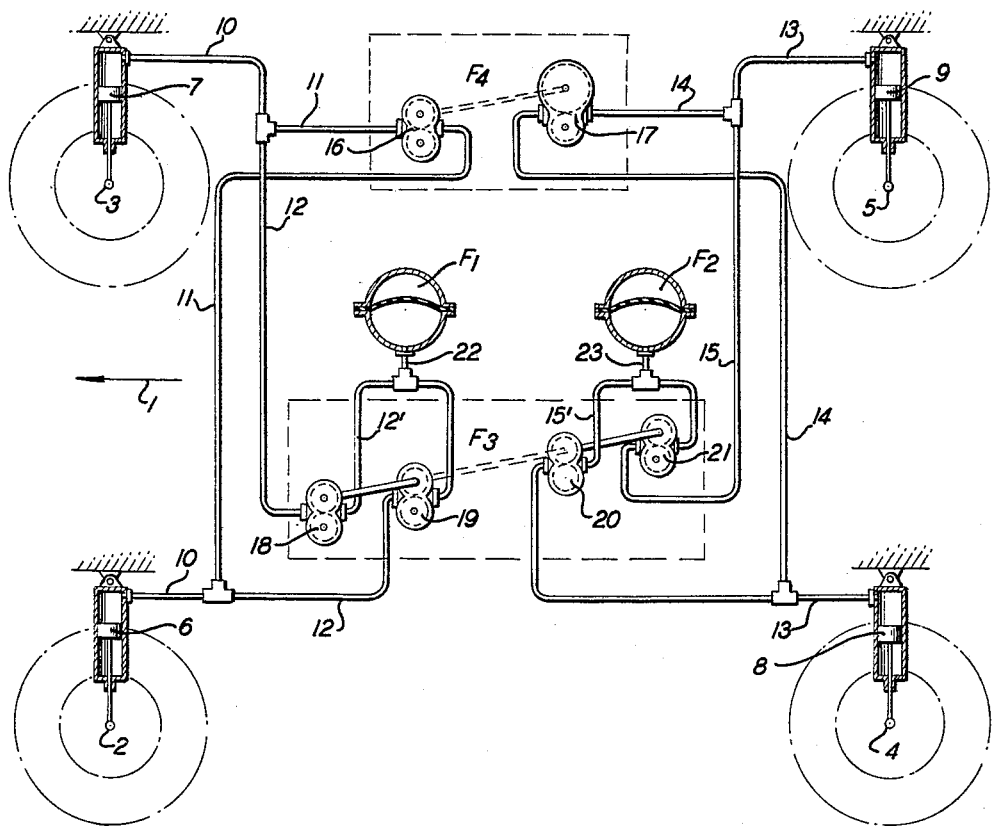

March 26, 1963  E. J. H. FIALA  3,083,033
EQUALIZATION SPRING SYSTEM FOR VEHICLES
Filed July 1, 1958

INVENTOR.
ERNST J. H. FIALA
BY Dicke and Craig
ATTORNEYS

United States Patent Office 3,083,033
Patented Mar. 26, 1963

3,083,033
EQUALIZATION SPRING SYSTEM FOR VEHICLES
Ernst J. H. Fiala, Sindelfingen, Kreis Boblingen, Germany, assignor to Daimler-Benz Aktiengesellschaft, Stuttgart-Unterturkheim, Germany
Filed July 1, 1958, Ser. No. 746,313
Claims priority, application Germany July 10, 1957
25 Claims. (Cl. 280—104)

The present invention relates to an equalization spring system for vehicles, especially motor vehicles, in which a connecting system is provided between two oppositely disposed wheels, for example, between the two front wheels and the two rear wheels, which system permits oppositely directed spring movements of respective oppositely disposed wheels without hindrance while, however, permitting unidirectional spring movements of respective oppositely disposed wheels only against spring and/or shock-absorber forces, whereby those movements corresponding to oppositely directed wheel spring movements of the one connecting system, for example, the one effective between the front wheels, are transmitted in the opposite direction to the other connecting system, for example, to the one effective between the rear wheels, and those movements corresponding to unidirectional wheel spring movements of the one connecting system are transmitted in the same direction to the other connecting system.

According to the present invention, it is proposed that in each of the two connecting systems a means is provided which can remain at rest with oppositely directed spring movements of the two wheels, and be set into motion with unidirectional spring movements of the two wheels, and which is connected, preferably springily, with the corresponding means of the other connecting system in the direction of a transmission of unidirectional spring movements.

It is possible in this manner to provide a spring system, the spring stiffnesses of which are independent of one another for the most important conditions during operation of the vehicle, such as movements of the vehicle parallel to the road plane, curve inclination, brake or accelerating nodding or tilting movements and traversal of unevenness or obstacles in the road, and, furthermore, keep torsional stresses and loads away from the frame as will be more fully demonstrated by reference to the illustrated embodiment hereinafter.

In accordance with the main inventive concept of the present invention, it is proposed that, connected in parallel with a line containing a pressure medium for transmitting the spring movements of two oppositely disposed wheels, a further line is provided in which two hydraulic motors are arranged which are operatively mechanically connected with each other in the direction of a counter-operation with respect to each other, and that the pressure medium in the center section of the auxiliary parallel line disposed between the two hydraulic motors is subjected to a spring pressure, especially the pressure of a pneumatic spring.

Furthermore, the installation in accordance with the present invention may be so constructed that in the section of the transmission line by-passed by the auxiliary line one further hydraulic motor is arranged between each two oppositely disposed wheels and that these two last-mentioned hydraulic motors which are coordinated to a respective connecting system are interconnected mechanically with each other, preferably springily, for example, by means of a torsion rod in such a manner that a flow of the pressure medium between one wheel pair in a predetermined direction, for example, in front from left to right, produces an oppositely directed flow of the pressure medium between the other wheel pair, for example, at the rear from right to left.

According to a further feature in accordance with the present invention, a speed reduction may be inserted into the connection effective during oppositely directed spring movements of oppositely disposed wheels between the two connecting systems, for example, in that the wheels of the two further hydraulic motors connected by the torsion rod have different gear diameters. By the use of such an arrangement, it is possible to obtain a system in which, during traversal of curves, the wheel pressure differences in front and in the rear of the vehicle are at a predetermined ratio to each other. By appropriately selecting this ratio, i.e., the inserted or interconnected speed reduction, a certain characteristic or behavior of the vehicle with respect to oversteering or understeering may be readily achieved.

For purposes of transmitting unidirectional spring movements from the one connecting system between two oppositely disposed wheels to the other system, it is proposed in accordance with the present invention that the hydraulic motors disposed in the auxiliary line of each of the two connecting systems are operatively connected with each other by a suitable mechanical driving engagement, for example, by the aid of a torsion rod in such a manner that each pair of motors coordinated to a respective connecting system operates in the same direction.

Accordingly, it is an object of the present invention to provide an equalization spring system for vehicles, particularly motor vehicles which is characterized by its versatility and excellent performance under different driving conditions.

Another object of the present invention is to provide a spring system including an equalization spring system for vehicles in which the spring stiffness may be made relatively independent for different driving conditions.

Another object of the present invention is the provision of an equalization spring system for motor vehicles in which the spring stiffness may be adapted to the particular needs under different driving conditions essentially independently of one another, for example, with the occurrence of oppositely directed or unidirectional spring movements of the wheels, traversal of the curves, etc.

Still another object of the present invention is the provision of an equalization spring system for vehicles which is so designed as to keep away as much as possible from the frame or chassis or from the self-supporting vehicle body, all stresses coming from the road, particularly twisting or torsional stresses in the frame.

Figure 2:
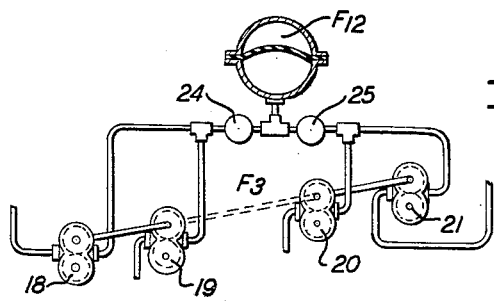

These and other objects, features and advantages of the present invention will become more obvious from the following description when taken in connection with the accompanying drawing which shows, for purposes of illustration only, two embodiments in accordance with the present invention, and wherein:

FIGURE 1 is a schematic view of an equalization spring system in accordance with the present invention, and FIGURE 2 is a partial schematic view of a modified embodiment of an equalization spring system in accordance with the present invention.

Referring now to the drawing, wherein like reference numerals are used to designate corresponding parts in the two views thereof, and more particularly to FIGURE 1, the arrow designated by reference numeral 1 indicates therein the normal or forward direction of drive of the vehicle. Reference numerals 2 and 3 schematically indicate the axles of the left and right front wheel, respectively, while reference numerals 4 and 5 designate the axles of the left and right rear wheels, respectively. The axles may be of any suitable construction used in connection with the wheel suspensions, particularly with independently suspended wheels of any known construction.

The wheel axles 2, 3, 4 and 5 are operatively connected with piston members 6, 7, 8 and 9, respectively, which displace a pressure medium, preferably a hydraulic medium disposed in the line or conduit system of the equalization spring system. The connection between the wheel axles and the piston members is shown in the drawing only schematically, as is the rest of the system, and may be of any well-known construction.

The connecting system between the two front wheels 2 and 3 consists of two pressure-medium line sections 10 which branch off into a main branch line 11 and an auxiliary branch line 12. Thus, a parallel line network consisting of branch lines 11 and 12 interconnects the line sections 10 with one another. The connecting system between the two rear wheels 4 and 5 consists correspondingly of two pressure-medium line sections 13 which are branched off into a main branch line 14 and into an auxiliary branch line 15 connected in parallel therewith.

A hydraulic gear motor 16 of any suitable construction, which may also be effective as a pump as is the case also with all hydraulic motors used in accordance with the present invention, is arranged in the main branch line 11 of the connecting line system for the front wheels. A gear motor 17 also adapted to operate as a gear pump is similarly arranged in the main line 14 of the connecting system for the rear wheels. The two gear motors 16 and 17 are connected with each other by a torsion rod $F_4$. The gear wheels of pumps 16 and 17, respectively, which are connected with each other by the torsion rod $F_4$, have different diameters, as is clearly shown in FIGURE 1.

Two gear motors 18 and 19 of suitable construction are arranged in the auxiliary branch line 12 of the connecting system for the front wheels and two gear motors 20 and 21 are connected in the auxiliary branch line 15 of the connecting system for the rear wheels. The motors 18 and 19, on the one hand, and the motors 20 and 21, on the other, are rigidly connected with each other. Both pairs of motors 18, 19 and 20, 21 are operatively connected with each other by another torsion rod $F_3$. A branch line 22 leads from the line portion 12' interconnecting the gear motors 18 and 19 to a hydro-pneumatic spring $F_1$ and a branch line 23 leads from the connecting line portion 15' interconnecting the gear motors 20 and 21 and leading to the hydro-pneumatic spring $F_2$.

It should be noted that motors 18 and 19, as well as motors 20 and 21, are so connected in the respective connecting system 10, 12, 12', 12, 10 and 13, 15, 15', 15, 13 that changes in the same direction in the respective line sections of each rigidly interconnected pair of motors will seek to rotate the same in the same direction. Thus, for example, an increase due to upward movement of piston members 6, 7, 8 and 9 will seek to rotate motors 18, 19, 20 and 21 in the same direction. In contradistinction thereto, motors 16 and 17 are so connected in their respective line systems that each is operative only in case of pressure differences between input and output thereof, i.e., between oppositely disposed wheels, and that such pressure differences, if existing in the front and rear system on the same side, will seek to rotate the motors 16 and 17 in opposite direction.

OPERATION

The operation of the equalization spring system in accordance with the present invention, for different driving conditions, will now be described in detail by reference to the accompanying drawing.

*Movement of the Vehicle Parallel to the Road Plane*

The operation of the equalization spring system during movement of the vehicle essentially parallel to the road plane is as follows.

With spring movements during which the vehicle remains essentially parallel relative to the road surface, the pressure in all of the lines, for example, increases when all the piston members 6 through 9 move upwardly. The gear motors 18 and 19, as well as the gear motors 20 and 21, are loaded or acted on by the pressure medium in the same direction so that the pressure increase may also continue to the interconnecting line sections 12' and 15' and to the branch lines 22 and 23 and therewith to the hydro-pneumatic springs $F_1$ and $F_2$ whereby hydro-pneumatic springs $F_1$ and $F_2$ are subjected to the pressure increase in the hydraulic system. The resilient or elastic element $F_3$ thereby synchronizes the movement of the gear motors 18 and 19, on the one hand, and of the gear motors 20 and 21, on the other, and thereby prevents the creation of nodding or nose-diving movements of the vehicle.

The gear motors 16 and 17 do not move since the same pressure increase occurs on both sides of the gear teeth thereof. In order to achieve special spring characteristics, the springs $F_1$ and $F_2$ may be constructed differently or may be selected to have different spring characteristics. In particular, it is possible to make the springs $F_1$ and $F_2$ very soft because, as will appear more fully hereinafter, they have no influence on the stiffness and spring characteristics of the vehicle during movements thereof about a longitudinal vehicle axis.

*Curve Tilting*

During traversal of a curve, the equalization spring system in accordance with the present invention operates as follows.

During traversal, for example, of a left curve, the pressure in pistons 7 and 9 increases by about the same extent as the pressure decreases in the pistons 6 and 8. The hydro-pneumatic springs $F_1$ and $F_2$, however, are not influenced by the resulting pressure changes since a moment of the same magnitude but of opposite direction acts or is effective on the individual gear motors 18 and 19 of the rigidly interconnected pair 18/19 and on the individual gear motors 20 and 21 of the rigidly interconnected pair 20/21 so that these gears motors 18, 19, 20 and 21 do not move at all. Consequently, springs $F_1$ and $F_2$ are essentially inoperative or unaffected during inclinations of the body in curves. In contrast thereto, oppositely directed moments occur at the gear wheels of the motors 16 and 17 tending to rotate the same in opposite directions so that the spring $F_4$ is tensioned, i.e., is subjected to torsional stresses. By reason of the different size of the gear wheels of motors 16 and 17 interconnected by the torsion rod $F_4$, equilibrium in the system can only occur if the pressure difference between the two sections of line 14 separated by the motor 17 is smaller at a ratio corresponding to the gear diameters than in the two sections of line 11 separated by motor 16. The magnitude or amplitude of the curve inclination or tilting of the vehicle body is determined solely by the stiffness of the torsion rod $F_4$ and is independent of the stiffness of the springs $F_1$ and $F_2$. Consequently, the inclination or tilting of the vehicle body during traversal of curves may be kept as small as desired. However, it should be noted that with a very hard spring element $F_4$, all of the other moments about the vehicle longitudinal axis are also absorbed in a relatively hard manner.

*Brake and Accelerating Nodding Movements*

The operation of the spring equalization system during acceleration and braking or deceleration of the vehicle is as follows.

During braking, it being understood that analogous considerations apply to acceleration, the pressure in lines 10, 11 and 12 increases and correspondingly decreases in lines 13, 14 and 15 since the vehicle front end goes down while the rear end thereof goes up resulting in so-called nodding or nose-diving movements. As a result thereof, moments directed in the same direction are exerted on each of the gear wheels of the pair of motors 18 and 19 and of the pair of motors 20 and 21 which tend to rotate the same. However, the moments applied to the pair 18/19 and to the pair 20/21 are directed oppositely with respect to each other. In other words, the increase of pressure in lines 12 seeks to rotate rigidly interconnected gear motors 18 and 19 in one direction, and the decrease of pressure in lines 14 seeks to rotate rigidly interconnected motors 20 and 21 in the opposite direction. Consequently, the torsion rod $F_3$ is tensioned. The magnitude of the nodding movement with a given moment depends, therefore, on spring element $F_3$, as well as on the stiffness of springs $F_1$ and $F_2$. With an increasingly stiffer torsion rod $F_3$, the braking tilting or nose-diving of the vehicle becomes smaller and can be made suitably small.

Passing an Unevenness in the Road With Both Front Wheels

During driving over a road obstacle or unevenness essentially simultaneously with both wheels, the equalization spring system in accordance with the present invention operates as follows.

The unevenness in the road causes an increase in pressure in the line system 10 through 12. This increase in pressure sets the gear motors 18 and 19 into movement whereby, on the one hand, the spring $F_1$ is tensioned, and, on the other, the spring $F_2$ is also tensioned over torsion rod $F_3$ and the pressure in the line system 13, 14 and 15 is decreased. The obstacle or unevenness in the road is passed the better the softer the springs $F_1$, $F_2$ and $F_3$.

Advantageously, a slight brake nodding or nose-dive movement is accepted by selecting the torsion rod spring $F_3$ as not too stiff in order to obtain a soft passing over traversely extending obstacles in the road.

Unidirectional Movement of Two Diagonally Disposed Wheels

The operation of the equalization spring system in accordance with the present invention in case of unidirectional movements of two diagonally disposed wheels, such as the left front and right rear or the right front and left rear wheels, is as follows.

With the usual spring systems in which each wheel is spring suspended against the frame, particularly large torsional loads and stresses occur in the frame if the two front and the two rear wheels swing against each other in such a manner that with the right front wheel rising, the left rear wheel also rises, and the left front wheel as well as the right rear wheel move downwardly. In case of resonance conditions, the known vibratory or shaking movements take place.

These torsional loads or twisting stresses in the frame are prevented or quite considerably reduced by the use of an equalization spring system in accordance with the present invention. During rising, for example, of the right front wheel 3 and of the left rear wheel 4 and with the simultaneous lowering of the left front wheel 2 and of the right rear wheel 5, the gear motors 16 and 17 carry out a corresponding rotation without, however, changing the pressure in lines 10 and 13. The gear motors 18, 19, 20 and 21 thereby stand still. The prerequisite for the condition that the wheel pressure does not change, however, is the fact that the magnitude of the movement at the rear wheels is larger by the ratio of the gear diameters of gear motors 17 and 16 than the magnitude of the movement of the front wheels. If this is not exactly the case, then equalization is produced by the softness or elasticity of the torsion rod $F_4$, whereby, however, certain twisting moments may be led into the frame.

Any other case of operating condition of the spring system may be reduced to one of the five basic cases enumerated and discussed hereinabove or to a combination thereof.

For purposes of damping vibrations, throttling places may be provided at suitable points in the system, for example, in the form of throttle valves or places in the lines with particularly slight cross section, whereby the throttling places may again be such as to offer different resistance to different directions of movement.

Since throttling devices which offer different resistances to the flow of the fluid in different directions, i.e., in opposite directions, are well known in the art, a detailed description thereof is dispensed with herein.

Moreover, the rotational movements and/or the spring movements of the springs $F_3$ and $F_4$ may be damped by any suitable means, well known in the prior art.

In the modified embodiment according to FIGURE 2 the springs $F_1$ and $F_2$ are combined into a single hydropneumatic spring $F_{12}$. Reference numerals 24 and 25 designate therein throttling valves which serve particularly for purposes of damping the nodding movements of the vehicle. Otherwise, the embodiment according to FIGURE 2 is similar to that of FIGURE 1 and operates in the same manner.

The term "superstructure" is used in the present application to designate the vehicle frame, the vehicle body, such as a self-supporting vehicle body, or any other relatively stationary parts from which the wheels are suspended to provide relative movement with respect thereto.

The present invention is not limited to the embodiments illustrated herein but is susceptible of various modifications and changes within the scope and spirit of the present invention. For example, instead of gear motors and/or pumps, hydraulic piston motors and/or pumps of any suitable type may be used. For example, axial piston pumps and motors, radial piston pumps and motors, or any other suitable reversible-type hydraulic unit may be used. The term "hydraulic power unit" is used in the claims to designate any suitable motor-pump unit which can be used in connection with the present invention.

Consequently, it is quite obvious that the present invention is susceptible of many changes and modifications within the scope and spirit of the present invention, and I, therefore, intend to cover all such changes and modifications as are encompassed by the scope of the appended claims.

I claim:

1. An equalization spring system for vehicles having two pairs of spring-suspended wheels, the two wheels of each said pair being disposed on opposite sides of the central longitudinal plane of said vehicle in the transverse direction thereof, and axle means for said wheels, comprising spring means adapted to produce a spring force, first connecting means operatively associated with said spring means and connecting the axle means of two of said oppositely disposed wheels to enable unimpaired spring movements of said two last-mentioned wheels in opposite directions while effectively opposing said spring force to unidirectional movements thereof, second connecting means operatively associated with said spring means and connecting the axle means of the two other of said oppositely disposed wheels to enable unimpaired spring movement in opposite directions of said two last-mentioned wheels while effectively opposing said spring force to unidirectional movements thereof, and third means interconnecting said two connecting means so as to transmit the movements of one of said connecting means corresponding to oppositely directed spring movements of the wheels connected thereby to the other of said connecting means in the opposite direction while transmitting the movements of one of said connecting means corresponding to unidirectional wheel movements to the other of said connecting means in the same direction.

2. An equalization spring system for vehicles having two pairs of spring-suspended wheels, the two wheels of each said pair being disposed on opposite sides of the central longitudinal plane of said vehicle in the transverse direction thereof, and with axle means for said wheels, comprising spring means adapted to produce a spring force, first hydraulic connecting means operatively associated with said spring means and connecting the axle means of two of said oppositely disposed wheels to enable unimpaired spring movements of said two last-mentioned wheels in opposite directions while effectively opposing said spring force to unidirectional movements thereof, second hydraulic connecting means operatively associated with said spring means and connecting the axle means of the two other of said oppositely disposed wheels to enable unimpaired spring movement in opposite directions of said two last-mentioned wheels while effectively opposing said spring force to unidirectional movements thereof, and interconnecting means interconnecting said two connecting means so as to transmit the movements of one of said connecting means corresponding to oppositely directed spring movements of the wheels connected thereby to the other connecting means in the opposite direction while transferring the movements of one of said connecting means corresponding to unidirectional wheel movements in the same direction to the other connecting means, said interconnecting means including spring-movement responsive means operatively connected in each of said connecting means and effectively remaining at rest during oppositely directed movements of the respective pair of oppositely disposed wheels while being moved during unidirectional movements thereof, and connecting means operatively connecting the two spring-movement responsive means of said first and second connecting means for transmission therebetween of unidirectional spring movements of the wheels.

3. An equalization spring system for vehicles according to claim 2, wherein said last-mentioned connecting means includes spring means for springly connecting said two spring-movement responsive means with one another, said last-mentioned spring means opposing oppositely directed movements of said two spring-movement responsive means.

4. An equalization spring system for vehicles according to claim 2, wherein said interconnecting means transmitting the movements corresponding to oppositely directed wheel spring movements includes means providing a predetermined transmission ratio.

5. An equalization spring system for vehicles according to claim 2, wherein each of said first and second connecting means includes a line system provided with throttling means for purposes of damping swinging movements.

6. A hydraulic equalization spring system for vehicles having two pairs of spring-suspended wheels, the two wheels of each said pair being disposed on opposite sides of the central longitudinal plane of said vehicle in the transverse direction thereof, and with axle means for said wheels, comprising first connecting means including first means adapted to produce a spring force connecting the axle means of two of said oppositely disposed wheels to enable unimpaired spring movements of said two last-mentioned wheels in opposite directions while effectively opposing the spring force of said first means to unidirectional movements thereof, second connecting means including second means adapted to produce a spring force connecting the axle means of the two other of said oppositely disposed wheels to enable unimpaired spring movement in opposite directions of said two last-mentioned wheels while effectively opposing the spring force of said second means to unidirectional movements thereof, each of said connecting means including a main line section interconnecting a respective pair of oppositely disposed wheels and an auxiliary line section connected in parallel with a respective main line section, said first and second connecting means each containing a hydraulic pressure medium, and interconnecting means interconnecting said two connecting means so as to transmit the hydraulic movements in one of said connecting means corresponding to oppositely directed spring movements of the wheels connected thereby to the other connecting means in the opposite direction while transferring the movements of one of said connecting means corresponding to unidirectional wheel movements of the wheels connected thereby to the other connecting means in the same direction, said interconnecting means including two hydraulic power units operatively connected in each of said auxiliary line sections, a respective one of said power units being operatively associated with each said wheel, means mechanically linking the two power units of a respective pair thereof so as to operate in bucking relationship and thereby remain at rest during oppositely directed movements of the respective pair of oppositely disposed wheels while being moved during unidirectional movements thereof, and spring means operatively connecting said two pairs of power units with each other for transmission therebetween of unidirectional spring movements of the wheels.

7. An equalization spring system for vehicles according to claim 6, wherein each auxiliary line section includes a connecting line portion interconnecting the two power units operatively connected therein, and wherein said first and second spring means subject the pressure medium in said connecting line portions to spring pressure.

8. An equalization spring system for vehicles according to claim 7, wherein said first and second spring means consist of a single hydro-pneumatic spring, and separate means operatively connecting said spring to the connecting line portion of each auxiliary line portion.

9. An equalization spring system for vehicles according to claim 6, wherein each of said first and second connecting means includes a hydraulic power unit in the part of a respective main line section by-passed by said auxiliary line section, and wherein said interconnecting means includes means mechanically connecting said two last-mentioned hydraulic power units in such a manner that movement of one of said hydraulic units caused by the flow of the hydraulic medium in the corresponding main line section from one side of the vehicle to the other causes movement of the other hydraulic unit producing a flow in the corresponding main line section thereof in the opposite direction from said other to said one side of the vehicle.

10. An equalization spring system for vehicles according to claim 9, wherein said interconnecting means includes a torsion rod for springily interconnecting said two hydraulic power units.

11. An equalization spring system for vehicles according to claim 9, wherein said last-mentioned power units are reversible hydraulic gear motors, and wherein said means mechanically interconnecting said units mechanically interconnects the gears of said motors, the interconnected gears of said two motors being of different diameter whereby a predetermined transmission ratio is provided in the connection between said motors.

12. An equalization spring system for vehicles according to claim 5, wherein said throttling means offer different resistances to different directions of movement.

13. An equalization spring system for vehicles having two pairs of spring-suspended wheels, the two wheels of each said pair being disposed on opposite sides of the central longitudinal plane of said vehicle in the transverse direction thereof, and with axle means for said wheels, comprising first hydraulic force-connecting means including first means adapted to produce a spring force connecting the axle means of two of said oppositely disposed wheels to enable unimpaired spring movements of said two last-mentioned wheels in opposite directions while effectively opposing the spring force of said first means to unidirectional movements thereof, said first connecting means further including a main line section, an auxiliary branch line section connected in parallel therewith and two hydraulic power units arranged in said auxiliary line section, second hydraulic force-connecting means including second means adapted to produce a spring force connecting the axle means of the two other of said oppositely disposed wheels to enable unimpaired spring movement in opposite directions of said two last-mentioned wheels while effectively opposing the spring force of said second means to unidirectional movements thereof, said second connecting means further including a main line section, an auxiliary branch line section connected in parallel therewith and two hydraulic power units arranged in said last-mentioned auxiliary line section, and interconnecting means interconnecting said first and second connecting means so as to transmit the movements of one of said connecting means corresponding to oppositely directed spring movements of the pair of wheels associated therewith to the other connecting means in the opposite direction while transferring movements of one of said connecting means corresponding to unidirectional wheel movements of the pair of wheels associated therewith to the other connecting means in the same direction including means mechanically connecting said two pairs of hydraulic units with each other in such a manner that said units operate in the same direction.

14. An equalization spring system for vehicles according to claim 13, wherein each auxiliary line section includes a line portion interconnecting a respective pair of hydraulic units, branch line means operatively connected with said line portions, said first and second spring means being operatively connected with said branch line means.

15. An equalization spring system for vehicles according to claim 14, wherein said branch line means includes one branch line portion for each line portion, and wherein said first and second spring means each include a hydro-pneumatic spring a respective one of said hydro-pneumatic springs being connected with a respective branch line portion.

16. An equalization spring system for vehicles according to claim 14, wherein said first and second spring means consist of a single hydro-pneumatic spring, and wherein said branch line means effectively interconnects said spring with both of said line portions of said auxiliary line sections.

17. An equalization spring system for vehicles according to claim 16, wherein said branch line means includes one branch line section each which is operatively connected with a respective line portion, one common branch line section interconnecting said two branch line sections with each other and with said single spring, and throttling means in each of said two first-mentioned branch line sections.

18. An equalization spring system for vehicles having two pairs of oppositely disposed front and rear wheels with axle means therefor, a superstructure and spring-suspension means for each of said axle means for suspending a respective axle means from said superstructure and allowing spring movements of said wheels, comprising first hydraulic connecting means including first means adapted to produce a spring force connecting the suspension means of said oppositely disposed front wheels to enable unimpaired spring movements of said last-mentioned wheels in opposite directions while effectively opposing the spring force of said first means to unidirectional movements thereof, second hydraulic connecting means including second means adapted to produce a spring force connecting the suspension means for the axle means of said oppositely disposed rear wheels to enable unimpaired spring movement in opposite directions of said last-mentioned wheels while effectively opposing the spring force of said second means to unidirectional movements thereof, each of said connecting means including a main line section having a hydraulic power unit operatively connected therein and an auxiliary branch line section connected in parallel with said main line section and having a pair of hydraulic power units arranged therein, means interconnecting the hydraulic power units of said two connecting means so as to transmit the hydraulic movement in one of said connecting means corresponding to oppositely directed spring movement of the wheels connected thereby to the other connecting means in the opposite direction while transferring the hydraulic movements in said one connecting means corresponding to unidirectional wheel movements to the other connecting means in the same direction, each said pair of power units being operatively connected in each of said connecting means in such a manner as to remain at rest during oppositely directed movements of the respective wheels while being moved during unidirectional movement of said wheels.

19. An equalization spring system for vehicles according to claim 18, wherein said interconnecting means includes first torsion rod spring means mechanically coupling the hydraulic power units in said main line sections with each other and second torsion rod spring means mechanically coupling said two pairs of power units with each other.

20. An equalization spring system for vehicles according to claim 19, wherein said first and second spring means include hydro-pneumatic spring means operatively connected with said auxiliary branch line sections intermediate the two pairs of power units thereof.

21. An equalization spring system for vehicles according to claim 7, wherein said first and second spring means each consist of a hydro-pneumatic spring, and means operatively connecting said spring to the connecting line portion of a respective auxiliary line section.

22. An equalization spring system for motor vehicles having springily supported oppositely disposed front and rear wheels, comprising a common spring means, force-transmitting means transmitting the forces absorbed by each individual wheel to said common spring means, and further means operatively connecting the force-transmitting means of diagonally opposite wheels with each other so that upon spring movement of a wheel in one direction said last-mentioned means has a tendency to produce a similar movement of the diagonally opposite wheel.

23. An equalization spring system for motor vehicles having a plurality of sets of oppositely disposed wheels, comprising common hydro-pneumatic spring means, and force-transmitting means transmitting the forces absorbed by each individual wheel to said common spring means including means operatively connecting two diagonally opposite wheels with each other in such a manner that the force-transmitting means thereof are springily connected with each other, said last-mentioned means being constructed and arranged so that upon movement of one of said diagonally opposite wheels said means has a tendency to produce a unidirectional spring movement of the other of said two diagonally opposite wheels, and means operatively connecting oppositely disposed wheels with each other for transmitting the forces caused by only unidirectional spring movements thereof to said common spring means.

24. An equalization spring system for motor vehicles having a plurality of sets of oppositely disposed wheels, comprising relatively soft common spring means, and force-transmitting means transmitting the forces absorbed by each individual wheel to said common spring means including two conduit means each operatively connecting a respective pair of opposite wheels with each other in such a manner that unidirectional spring movements thereof tend to cause a flow of pressure medium contained therein in opposite directions, branch line means leading from each conduit means to said common spring means, and connecting means in each conduit means including means providing a relatively stiff spring characteristic effectively interconnecting diagonally opposite wheels with each other and having a tendency to produce unidirectional spring movements of each pair of diagonally opposite wheels with the occurrence of a spring movement of one wheel of a respective pair.

25. An equalization spring system for vehicles according to claim 24, wherein said connecting means further includes a plurality of reversible hydraulic pump-motor units, and wherein said means having a relatively stiff spring characteristic comprises mechanical means operatively connecting two of said units corresponding to diagonally opposite wheels with each other.

References Cited in the file of this patent

UNITED STATES PATENTS

| | | |
|---|---|---|
| 2,466,833 | Allen | Apr. 12, 1949 |
| 2,593,040 | Lloyd | Apr. 15, 1952 |
| 2,828,138 | Brueder | Mar. 25, 1958 |
| 2,843,396 | Lucien | July 15, 1958 |